United States Patent [19]

Tanaka et al.

[11] Patent Number: 5,086,865
[45] Date of Patent: Feb. 11, 1992

[54] REGENERATIVE BRAKING SYSTEM FOR CAR

[75] Inventors: Koji Tanaka; Takashi Shima, both of Tokyo, Japan

[73] Assignee: Isuzu Motors Limited, Tokyo, Japan

[21] Appl. No.: 424,727

[22] Filed: Oct. 20, 1989

[30] Foreign Application Priority Data

Oct. 26, 1988 [JP] Japan .................................. 63-270268
Oct. 27, 1988 [JP] Japan .................................. 63-271527

[51] Int. Cl.$^5$ .............................................. B60K 9/00
[52] U.S. Cl. ......................................... 180/165; 60/414; 180/178; 188/273; 303/95; 303/100; 364/426.01
[58] Field of Search ................ 188/273; 180/165, 179, 180/178; 60/413, 414; 303/95, 100; 364/426.01, 426.04

[56] References Cited

U.S. PATENT DOCUMENTS

| | | | |
|---|---|---|---|
| 4,240,515 | 12/1980 | Kirkwood | 180/165 |
| 4,273,208 | 6/1981 | Liermann | 188/273 X |
| 4,351,409 | 9/1982 | Malik | 180/165 |
| 4,382,484 | 5/1983 | Anderson et al. | 180/165 |
| 4,592,454 | 6/1986 | Michel | 180/165 X |
| 4,669,435 | 6/1987 | Furusawa et al. | 188/273 X |
| 4,741,410 | 5/1988 | Tunmore | 180/165 |
| 4,760,697 | 8/1988 | Heggie et al. | 180/165 X |
| 4,813,510 | 3/1989 | Lexen | 180/165 |
| 4,819,696 | 4/1989 | Takikawa et al. | 188/273 X |

FOREIGN PATENT DOCUMENTS

| | | |
|---|---|---|
| 61-175150 | 8/1986 | Japan . |
| 61-175151 | 8/1986 | Japan . |
| 61-175152 | 8/1986 | Japan . |
| 61-175153 | 8/1986 | Japan . |
| 61-175154 | 8/1986 | Japan . |
| 62-15128 | 1/1987 | Japan . |
| 62-18324 | 1/1987 | Japan . |
| 62-18325 | 1/1987 | Japan . |
| 62-18326 | 1/1987 | Japan . |
| 62-18327 | 1/1987 | Japan . |
| 62-31522 | 2/1987 | Japan . |
| 62-31523 | 2/1987 | Japan . |
| 62-34819 | 2/1987 | Japan . |
| 62-37215 | 2/1987 | Japan . |
| 62-37216 | 2/1987 | Japan . |
| 62-37217 | 2/1987 | Japan . |
| 62-37218 | 2/1987 | Japan . |
| 62-39325 | 2/1987 | Japan . |
| 62-39326 | 2/1987 | Japan . |
| 62-39327 | 2/1987 | Japan . |

OTHER PUBLICATIONS

1979 Society of Automotive Engineers, Inc., "Improvement of Citybus Fuel Economy Using a Hydraulic Hybrid Propulsion System—A Theoretical and Experimental Study", by P. Buchwald et al., pp. 1-15.

1985 Society of Automotive Engineers, Inc., "Predicting the Retardation Performance of Vehicles Equipped with Hydro-Pneumatic Energy Storage System", by Anthony S. Davies et al., pp. 2.516-2.523.

1985 Society of Automotive Engineers, Inc., "Studies of an Accumulator Energy-Storage Automobile Design with a Single Pump/Motor Unit", by S. Tollefson et al., pp. 1-9.

1985 Society of Automotive Engineers, Inc., "Fuel Economy and Operating Characteristics of a Hydropneumatic Energy Storage Automobile", Peirong Wu et al., pp. 1-10.

(List continued on next page.)

Primary Examiner—Andres Kashnikow
Assistant Examiner—Michael Mar
Attorney, Agent, or Firm—Staas & Halsey

[57] ABSTRACT

A regenerative braking system for a car in which the pumping capacity of a pump/motor is responsive to the inner pressure of a hydraulic circuit by determining exhaust/engine brake equivalent torque corresponding to car speed and gear position when the car speed exceeds a predetermined speed. A manual operating device for an exhaust brake is or is not operated, so that the engine of the car is decoupled, the hydraulic oil circuit is closed, the pumping capacity is controlled, and an electromagnetic clutch is coupled to accumulate the deceleration energy of the car into the high pressure accumulator as if an exhaust/engine brake works.

12 Claims, 19 Drawing Sheets

OTHER PUBLICATIONS

Automotive Engineering, vol. 92, No. 10, Oct. 1984, *International Viewpoints*, "Regenerative Braking for Buses Gives Big Fuel Saving", by David Scott and Jack Yamaguchi, pp. 95-99.

Commercial Motor, Jan. 24, 1987, *Brakes Developments*, "Braking New Ground", pp. 35-36.

"Cumulo Bus for London", Dec. 1985, p. 537.

Automotive Engineering, vol. 87, No. 10, Oct. 1979, *International Viewpoints*, "Regenerative Braking Cuts Bus Fuel Needs", by David Scott, pp. 102-107.

ATZ Automobiltechnische Zeitschrift 80 (1978) 12, "Hydro-Bus-Ein Stadtlinienbus mit hydrostatischer Bremsenergieruckgewinnung", by Thomas Thier et al., pp. 597-600.

ATZ Automobiltechnische Zeitschrift 81 (1979) 7/8, "Antriebe zur Bremsenergie-Ruckgewinnung bei Omnibussen", by Faust Hagin et al., pp. 327-330.

University of Queensland, May 1984, Department of Mechanical Engineering, (Drawing of Figure 4) "Optimisation of a Regenerative Energy Storage System for a 10 Tonne Bus", by M. K. Vint.

University of Queensland, Aug. 1986, Department of Mechanical Engineering, "Overview of the Design and Installation of a Regenerative Braking, Storage and Propulsion System for a Leyland Panther Bus", by M. K. Vint, pp. (i)-5.

"Transmission of Engine/Flywheel Hybrid Vehicles" by Tsuneji Yada, vol. 37, No. 3, 1983, pp. 274-281.

"Regenerative Systems of Braking Energy", by Yuzuru Matsuura, vol. 32, No. 5, 1978, pp. 410-416.

FIG. 13

FLAG FL_SPEED

| BIT | INDICATED CAR SPEED |
|---|---|
| b 0 | SET AT STOPPAGE |
| b 1 | SET WHEN $V \leq 2$ Km/h |
| b 2 | SET WHEN $2$ Km/h $< V \leq 10$ Km/h |
| b 3 | SET WHEN $10$ Km/h $< V \leq 20$ Km/h |
| b 4 | SET WHEN $20$ Km/h $< V \leq 30$ Km/h |
| b 5 | SET WHEN $30$ Km/h $< V \leq 40$ Km/h |
| b 6 | SET WHEN $40$ Km/h $< V \leq 50$ Km/h |
| b 7 | SET AT 50 Km/h |

FIG. 14
FLAG FL_RBS

| BIT | SET CONDITION | RESET CONDITION |
|---|---|---|
| b0 | AT ENTRANCE INTO ENERGY RECOVERY MODE | AT ENTRANCE INTO OTHER MODES |
| b1 | AT ENTRANCE INTO ENERGY REGENERATIVE MODE | |
| b2 | AT ENTRANCE INTO CONVENTIONAL BRAKE CONTROL MODE | |
| b3 | AT REQUIRING CLUTCH TO BE DECOUPLED | AT ENABLING CLUTCH TO BE COUPLED |

FIG. 15

FLAG FL_PEDAL

| BIT | 0 | 1 | RESET CONDITION |
|---|---|---|---|
| b0 (BRK1) | NEW ENERGY RECOVERY CONTROL | CONTROL LATER THAN 2ND | CONVENTIONAL BRAKE CONTROL/AT THE HEAD OF ENERGY REGENERATIVE CONTROL |
| b1 (BRK2) | UNNECESSARY BRAKING | NECESSARY BRAKING | |
| b2 (ACC1) | NEW ENERGY REGENERATIVE CONTROL | CONTROL LATER THAN 2ND | CONVENTIONAL BRAKE CONTROL/AT THE HEAD OF ENERGY RECOVERY CONTROL |
| b3 (ACC2) | | | |

5,086,865

REGENERATIVE BRAKING SYSTEM FOR CAR

CROSS REFERENCE TO RELATED APPLICATIONS

This application is related to our U.S. patent application Ser. No. 07/424,554, filed Oct. 20, 1989, now U.S. Pat. No. 5,024,489 U.S. patent application Ser. No. 07/424,825, filed Oct. 20, 1989, and U.S. patent application Ser. No. 07/424,723, filed Oct. 20, 1989.

BACKGROUND OF THE INVENTION

The present invention relates to a regenerative braking system for a car, and particularly to a regenerative braking system for a car wherein the decelerating energy of the car is captured and used for the starting/accelerating energy.

In a PTO (Power-take-off) output unit (system) or a deceleration energy recovery system as conventionally known, a part of the kinetic energy dissipated mainly as heat at a brake or engine during the deceleration of a car, is captured in the form of hydraulic operating oil and accumulated in an accumulator. The accumulated energy is utilized for the starting energy and accelerating energy of the car.

For example, in 1976 C. J. Lorence Corporation in England announced the development of such a system using a bus of British Leyland Corporation. Since then, various research and development has been conducted in Europe.

Recently, Japanese Patent Application Laid-open Nos. 62-15128, 62-37215, 62-39327 etc. have disclosed a deceleration energy recovery system which is essentially formed of a transmission (hereinafter referred to as T/M), a multi-stage gear-changed PTO unit, a PTO output shaft, a pump/motor, a hydraulic oil circuit, an electromagnetic clutch, an accumulator, and a control unit.

The T/M includes a counter shaft driven through an engine clutch, a main shaft connected to a wheel driving line, and a multi-staged gear train mechanism transferring the rotation of the counter shaft to the main shaft through the gears. The multi-stage gear-changed PTO unit includes a counter shaft PTO gear disconnectably coupled to the counter shaft through a counter shaft PTO gear synchronizer, a main shaft PTO gear coupled to the counter shaft PTO gear and disconnectably coupled to the main shaft through a main shaft PTO gear synchronizer, and a PTO output shaft driven through driving gears coupled to the main shaft PTO gear. The pump/motor is coupled to the PTO output shaft. The hydraulic oil circuit includes a high pressure oil line and a low pressure oil line and serves to connect the accumulator to an oil tank through the pump/motor, and the electromagnetic clutch serves to connect/disconnect the oil circuit to/from the PTO shaft.

The control unit controls the electromagnetic clutch and works the pump/motor as either a pump or a motor in response to the running condition of the car. Namely, for working the pump/motor as a pump, the torque of the wheels during the decelerating mode serves to accumulate the operating oil into the accumulator through the PTO unit to capture the kinetic energy (i.e. braking energy mainly lost as heat in the brake or engine. For working the pump/motor as a motor, the operating oil accumulated in the accumulator serves to generate starting/accelerating torque to drive the wheels through the PTO unit.

The control manner of this control unit is as follows:

① When the car starts with the inner pressure of the accumulator being sufficient, the pump/motor is controlled to serve as a variable capacity type motor, the capacity of which is controlled by varying the displacement angle (incline angle) of the swash plate or shaft in response to the accelerator pedal positions.

Since the pump/motor is also connected to the electromagnetic clutch, when the electromagnetic clutch is coupled to the PTO unit by the control unit, the pump/motor drives the car based on the hydraulic power accumulated in the oil circuit.

In the meantime, when the car speed exceeds a preset value corresponding to the gear position selected by a driver, the engine clutch is coupled to the engine for the engine cruising. At the same time the PTO unit is gear-changed so as to turn off the counter shaft synchronizer which was on and turn on the main shaft synchronizer which was off, and the combined cruising of the pump/motor with the engine is carried out according to the hydraulic power based on the pedal position only if the accelerator pedal is largely operated by the foot.

② During the braking mode, the electromagnetic clutch is made on, and the displacement angle control signal (pump capacity control signal) according to the brake pedal position is supplied to the pump/motor for the corresponding pumping operation, while at the same time the engine is declutched.

Thus, the control unit controls the engine clutch to decouple the engine from the driving line of the wheels in order to capture a part of the braking energy which is to be consumed in the engine during the braking mode and to relieve the captured energy during the accelerating mode, while coupling the engine to the driving line in order to use the engine power alone or in combination with the motor during the starting/accelerating mode.

In such a prior art system, since the braking operation by the hydraulic power is not performed unless the brake pedal is operated by the foot, it is disadvantageous that the car cannot be braked by the hydraulic power in the same manner when a conventional exhaust brake is applied.

Also since the engine braking is used in combination with the hydraulic braking after the rotational speed of the engine has been increased up to the synchronous engine speed with the engine clutch being off when the brake pedal is restored, it is disadvantageous that braking energy dissipated as heat in the engine when the car is cruising in the engine braking mode, cannot be sufficiently recovered.

SUMMARY OF THE INVENTION

It is accordingly an object of the present invention to provide a regenerative braking system for a car which can recover braking energy equivalent to the actual exhaust braking energy in a conventional car by the pump/motor without consumption in the exhaust brake when neither the accelerator pedal nor the brake pedal is operated by the foot.

It is another object of the present invention to provide a regenerative braking system for a car which can recover braking energy equivalent to the actual engine braking energy in a conventional car by the pump/motor without consumption in the engine when neither the accelerator pedal nor the brake pedal is operated by the foot.

According to the present invention, as conceptually shown in FIG. 1A, control means 64 determines exhaust brake equivalent torque corresponding to the car speed and the gear position respectively indicated by car speed sensing means and a gear position sensing means when the car speed indicated by the car speed sensing means exceeds a predetermined speed and a manual operating means for an exhaust brake is operated. This determination can be made on the basis of a memory map in the control means 64 storing the relationship between exhaust brake equivalent torque, car speed, and gear position.

The control means 64 also determines the pumping capacity of a pump/motor 14 on the basis of the above noted exhaust brake equivalent torque as well as the inner pressure which may also be stored in the map, of a hydraulic circuit formed by a high pressure accumulator 26, a circuit valve 25, a pump/motor 14, and a low pressure accumulator 27, as is well-known. The control means 64 decouples the engine 1 and closes the hydraulic circuit, and couples an electromagnetic clutch 13. Thus, the driving energy from the wheels of the car is transferred to the pump/motor 14 through the PTO unit 8 to accumulate the hydraulic oil pressure into the high pressure accumulator 26, whereby the system operates just like a conventional exhaust/engine braking operation is being effected.

Alternatively, according to the present invention, as shown in FIG. 1A, the control means 64 determines engine brake equivalent torque corresponding to the car speed and the gear position respectively indicated by the car speed sensing means and gear position sensing means when the car speed indicated by the car speed sensing means exceeds a predetermined speed and a manual operating means for an exhaust brake is not operated. This determination can also be made on the basis of a memory map in the control means 64 storing the relationship between engine brake equivalent torque, car speed, and gear position.

The control means 64 also determines the pumping capacity of the pump/motor 14 on the basis of the above noted engine brake equivalent torque as well as the inner pressure of the hydraulic circuit which may also be stored in the map. The control means 64 decouples the engine 1 and closes the hydraulic circuit, and couples the electromagnetic clutch 13. Thus, the driving energy from the wheels of the car is transferred to the pump/motor 14 through the PTO unit 8 to accumulate the hydraulic oil pressure into the high pressure accumulator 26, whereby the system operates just like a conventional exhaust/engine braking operation is being effected.

BRIEF DESCRIPTION OF THE DRAWINGS

The present invention will be more apparent to those skilled in the art, from the following drawings in which:

FIG. 13 is a chart for explaining a flag FL-SPEED;

FIG. 14 is a chart for explaining flag FL-RBS;

FIG. 15 is a chart for explaining flag FL-PEDAL; and

Throughout the figures, the same reference numerals indicate indentical or corresponding portions.

DETAILED DESCRIPTION OF THE PREFERRED EMBODIMENTS

There will now be described the embodiments of a regenerative braking system for a car according to the present invention.

Figure 1B:
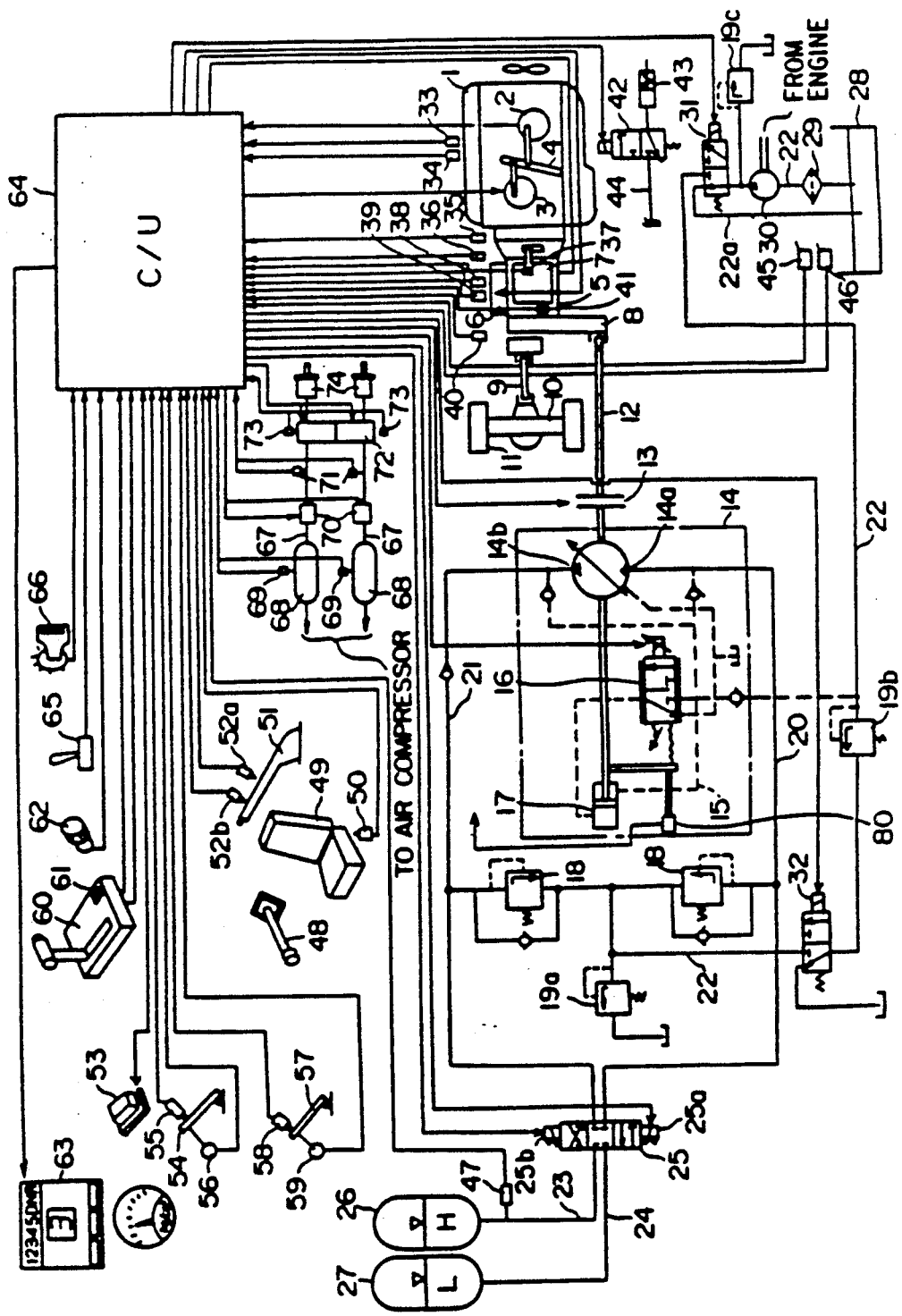
FIG. 1B is a schematic diagram of, the overall arrangement of an embodiment of a regenerative braking system for a car in accordance with the present invention.

Referring now to FIG. 1B, this overall arrangement of the regenerative braking system (hereinafter referred to as RBS) includes; an engine 1; a load sensor 2 for the engine 1; a step motor 3 responsive to the position of an accelerator pedal 54; an injection pump lever 4 which is controlled by the step motor 3 to set fuel supply into the engine 1 and is connected to the load sensor 2; a T/M (gearbox) 5 which provides as an output the changed rotation of the engine 1; a gear shift actuator 6 which automatically changes the gear ratio of the T/M 5; a clutch actuator 7 which automatically couples/decouples the engine clutch (not shown); a PTO unit 8 connected to the T/M 5; a propeller shaft 9 forming the driving line for wheels 11 together with an axle 10; a PTO shaft 12 of the PTO unit 8; an electromagnetic clutch 13; a well-known pump-motor 14 of a variable capacity swash plate type which is connected to the PTO unit 8 through the PTO shaft 12 and the electromagnetic clutch 13 and is combined with a displacement (incline) angle controlling pilot piping 15, a displacement angle controlling electromagnetic proportional valve 16, and a displacement angle controlling piston 17, and which has a suction port 14a and a discharge port 14b; and a displacement angle sensor 80 for sensing the displacement angle of the pump/motor 14.

Figure 2A:
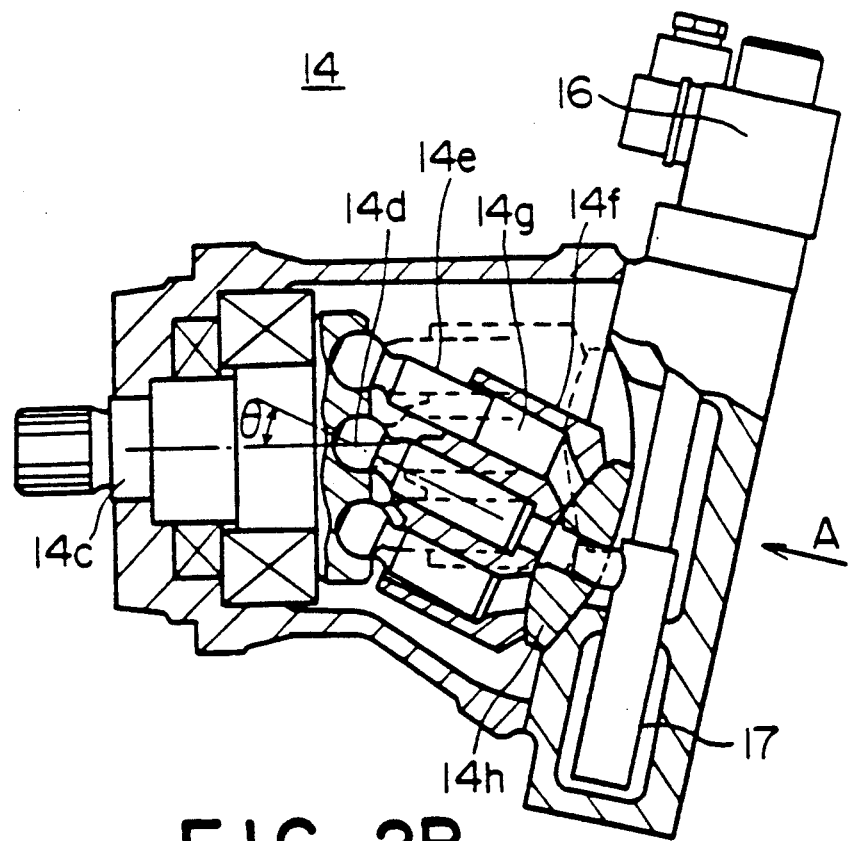
FIGS. 2A and 2B are respectively a sectional view and a perspective view of a swash shaft type pump/motor used for the present invention.
Figure 2B:
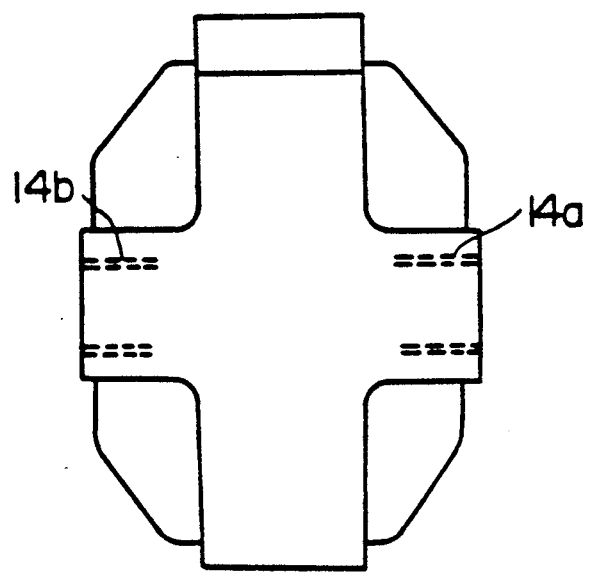

Now describing the pump/motor 14 on the basis of FIG. 2A and FIG. 2B seen from the direction of arrow A in FIG. 2A, a shaft 14d connected to an output shaft 14c is inserted into the central aperture of a cylinder block 14f, the opposite side of which is connected to the piston 17 through a port plate 14h. Also, the cylinder block 14f is provided at the periphery with a plurality of cylinders 14g each having one end slidably inserted with pistons 14e connected to the output shaft 14c and having another end connected through the port plate 14h to the suction port 14a or the discharge port 14b shown in FIG. 2B.

The piston 17 as above noted is movable in the up/down direction by the pressure of the operating oil supplied to the lower portion of the piston 17 from the pilot piping 15 or the operating oil within the oil pipings 20, 21 in proportion to the controlling current supplied to the electromagnetic proportional valve 16. Therefore, the assembly consisting of the cylinder block 14f, the piston 14e, the shaft 14d, and the port plate 14h varies its angle in accordance with the up/down movement of the controlling piston 17 connected to the output shaft 14c, where the angle $\theta$ formed by the output shaft 14c and the shaft 14d is called the above noted displacement angle.

FIG. 2A shows the case where the electromagnetic proportional valve 16 is supplied with the maximum control current, which provides the maximum displacement angle whereby the discharge amount per revolution of the output shaft 14c leads to the maximum. In the case where the electromagnetic proportional valve 16 has null control current therein, the displacement angle becomes null as shown by the dotted line, which leads to null discharge amount.

Back to FIG. 1B, the RBS further includes; a high pressure relief valve 18 for relieving the accumulation of a high pressure accumulator 26 which will be hereinafter mentioned when it exceeds a set value; a low pressure relief valve 19a for relieving the supply pressure of the operating oil of a replenishing circuit when it exceeds a set value; a low pressure relief valve 19b for creating pilot pressure required for displacing the capacity of the pump/motor 14 into the pilot piping 15; a piping 20 on the suction side of the pump/motor 14; a piping 21 on the discharge side of the pump/motor 14; a replenishing piping 22 for the operating oil; a return piping 22a for the operating oil; a high pressure side piping 23; a low pressure side piping 24; a circuit change-over valve 25 for changing over the above pipings 20~24; a high pressure accumulator 26 connected to the circuit change-over valve 25 through the high pressure side piping 23; and a low pressure accumulator 27 which is connected to the circuit change-over valve 25 through the low pressure side piping 24 and forms a hydraulic oil circuit together with the above pump/motor 14, the circuit change-over valve 25, and the high pressure accumulator 26.

It is to be noted that the circuit change-over valve 25 is necessary for changing over the pumping mode to the motoring mode with the suction/discharge port of the pump/motor 14 being unchanged, which can be replaced by a circuit shut-off valve if the pump/motor 14 is of a reversible type. The circuit change-over valve and circuit shut-off valve can be generally called a circuit valve.

Referring to the change-over operation of the pipings by the circuit change-over valve 25, when neither of the electromagnets 25a and 25b is excited, the valve 25 takes the position shown in the central portion in FIG. 1B from among three valve positions for the isolation between four pipings 20, 21, 23, and 24.

To recover the braking energy, the electromagnet 25a is excited to change-over the valve position to the side of electromagnet 25a. Then, the low pressure accumulator 27 can be interconnected with the suction port 14a of the pump/motor 14 through the pipings 24, 20 and the high pressure accumulator 26 can be interconnected with the discharge port 14b of the pump/motor 14 through the pipings 23, 21. Accordingly, the operating oil accumulated in the low pressure accumulator 27 is pumped by the pump/motor 14 working as a pump driven by the braking energy and is accumulated into the high pressure accumulator 26.

In contrast, to work the pump/motor 14 as a motor, the electromagnet 25b of the circuit change-over valve 25 is excited to change-over the valve to the position on the side of the electromagnet 25b. Then, the low pressure accumulator 27 can be interconnected with the discharge port 14b of the pump/motor 14 through the pipings 24, 21 and the high pressure accumulator 26 can be interconnected with the suction port 14a of the pump/motor 14 through the pipings 23, 20. As a result, the operating oil accumulated in the high pressure accumulator 26 passes through the pipings 23, 20 to rotate the pump/motor 14 as a motor, and then passes through the pipings 21, 24 to reach the low pressure accumulator 27 for the accumulation therein.

The RBS in FIG. 1B further includes: a drain tank 28 and a filter 29 for the operating oil; a replenishing pump 30 for the operating oil driven by the engine 1; electromagnetic valves 31 and 32 which are provided on the replenishing piping 22, supply the operating oil returned to the drain tank from the hydraulic oil circuit to the hydraulic oil circuit, and supply the pilot oil pressure through the pilot piping 15 to the pump/motor 14.

Furthermore, there are provided: a directly coupled cooling relay switch 33; a water coolant temperature sensor 34 for the engine 1; a rotational speed sensor 35 for the engine 1; a rotational speed sensor 36 for the input shaft; a clutch stroke sensor 37 for the T/M 5; a gear position sensor 38; a gear-shift stroke sensor 39; a car speed sensor 40 as a car speed sensing means; an oil temperature sensor 41 for the T/M 5; an exhaust brake control valve 42; a cylinder 43 for driving an exhaust brake valve (not shown); air piping 44 for supplying air pressure for the cylinder 43 through the exhaust brake control valve 42; and limit switches 45 and 46 provided in the drain tank 28 to detect the drain quantity; a pressure sensor 47 for sensing the pressure of the operating oil accumulated in the high pressure accumulator 26. It is to be noted that the gear position sensor 38 and the gear-shift stroke sensor 39 form gear position sensing means.

Finally, there are provided: a hand lever 48 for actuating exhaust braking: a driver's seat 49; an off-seat detection switch 50 for detecting whether or not the driver has left the driver's seat 49; a parking brake lever 51; parking brake switches 52a and 52b; a main switch 53 for the RBS; an accelerator pedal 54; an idle position detecting switch 55; an accelerator pedal position sensor 56; a brake pedal 57, a brake pedal return position detecting switch 58 (hereinafter simply referred to as a brake pedal switch); a brake pedal position sensor 59 which can also serve as a brake pedal switch; a gear selection lever 60; a switch 61 of a hill-start-aid apparatus (hereinafter referred to as HSA); an idle control switch 62; an indicator group 63; a door switch 65; a key switch 66; brake air piping 67; a brake air tank 68; a brake air pressure sensor 69; an electromagnetic proportional pressure control valve 70; air pressure switches 71 and 73; an HSA valve 72; an air master cylinder 74;

and a control unit 64 (hereinafter referred to as C/U) as control means for controlling the pump/motor 14 and the above noted various actuators on the basis of the outputs of the above-noted sensors and switches to recover the braking energy. It is to be noted that C/U 64 includes a memory (not shown) for storing programs, maps, and flags which will be mentioned.

Figure 1B:
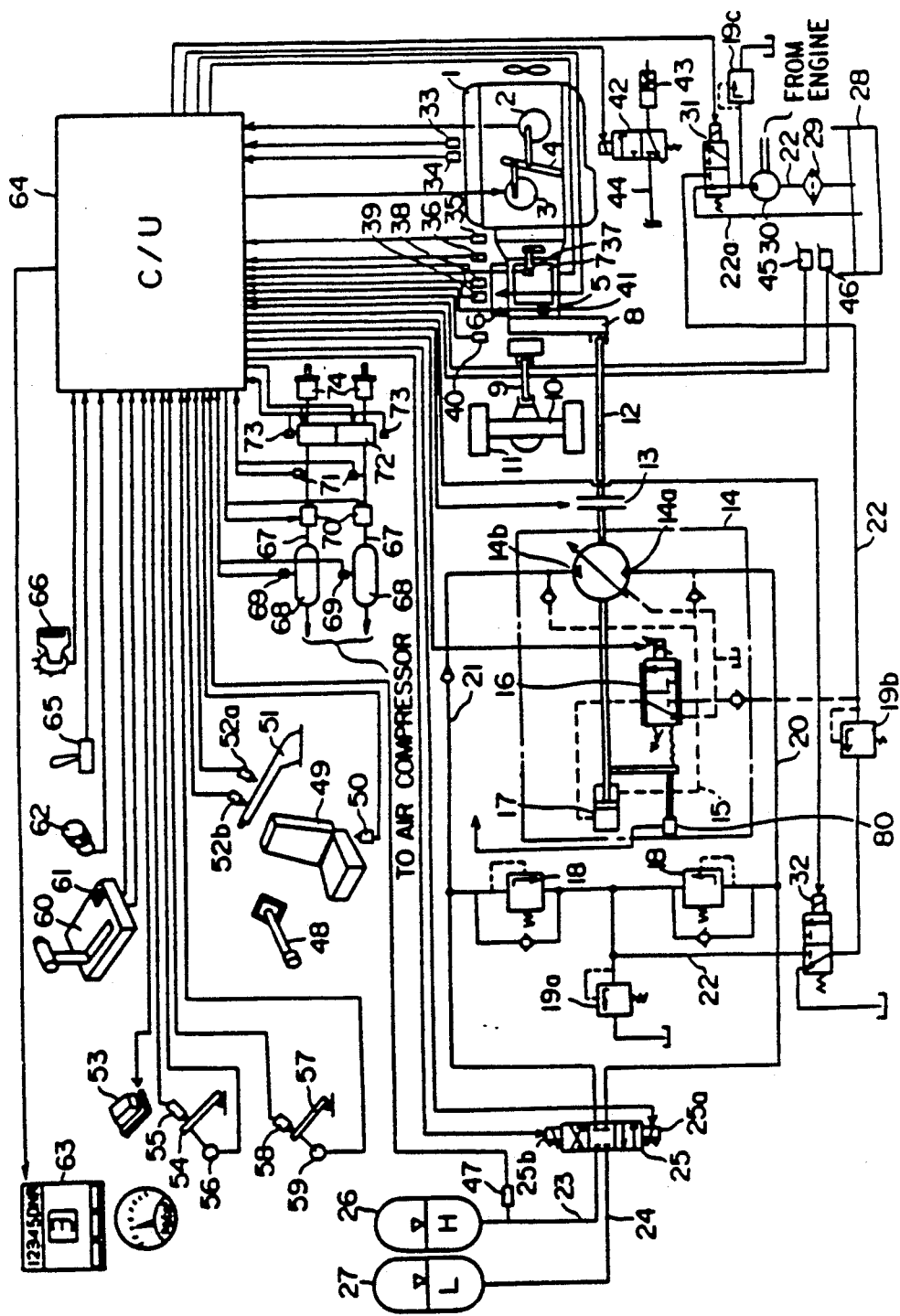
Figure 3:
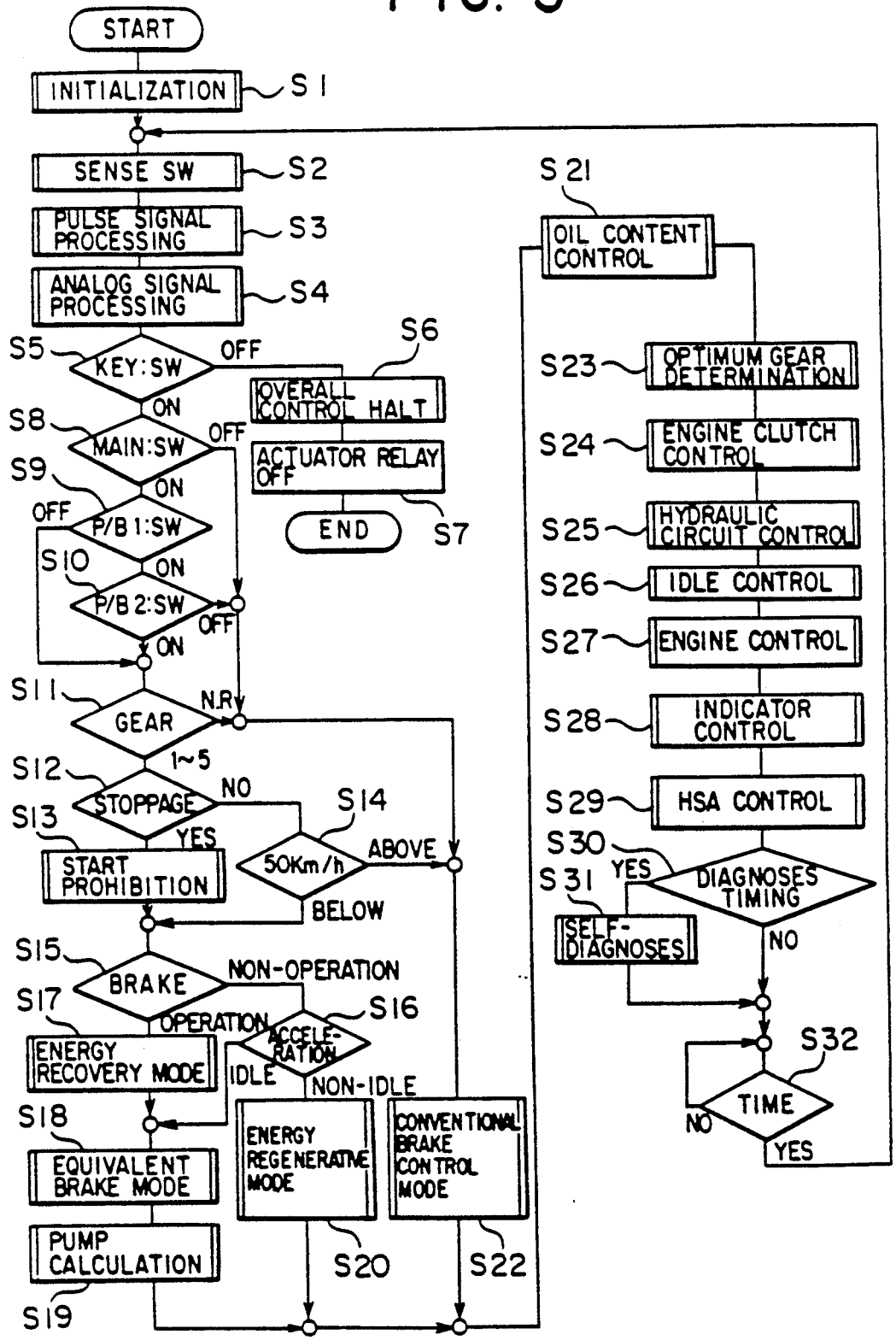
FIG. 3 is a flow chart of an entire program stored in and executed by control means according to the present invention.

FIG. 3 is an overall program flow chart stored in and executed by the C/U 64 shown in FIG. 1, based on which the operation of the embodiment shown in FIG. 1 will be described.

Starting the program, the C/U 64 executes an initialization subroutine in which all of the outputs are reset and a RAM (not shown) included therein is also reset (FIG. 3, step S1).

After the execution of the initialization, a subroutine for reading the signals from the above noted switches 33, 45, 46, 50, 52a, 52b, 53, 55, 58, 61, 62, 65, 66, 71 and 73 as well as the sensor 38 is executed (step S2), and then a processing subroutine for the rotational signal (pulse) read from the sensors 35, 36, and 40 is executed to calculate the engine rotational speed, the input shaft rotational speed and the car speed (step S3). These steps create flags FL-SPEED corresponding to the car speed as shown in FIG. 13, which will be described.

Then, a processing subroutine for analog signals read from the sensors 2, 34, 37, 39, 41, 47, 56, 59, 69 is executed to determine, in digital form, the engine load, the clutch stroke, the shift stroke, the oil temperature, the oil pressure, the accelerator pedal position, the brake pedal position, and the brake air pressure (step S4).

Data obtained by the reading operations and the processing of these signals are updated each C/U processing period. Also, flags (hereinafter mentioned) are set based on the signals as read and processed in those subroutines.

Next, it is checked whether or not the key switch 66 is on (step S5), where if it is off, an overall control halt subroutine will be executed (step S6). This subroutine stops the overall control by the interruption of the electric power of the C/U 64 with the actuator relay (not shown) being made off in step S7 after the hydraulic oil system has entirely resumed its safe condition, for the sake of safety even though the key switch 66 is made off in the stopping or running mode.

If it is found in step S5 that the key switch 66 is on, it is then checked whether or not the RBS main switch 53 is on (step S8). If it is off, a conventional brake control mode subroutine as will be mentioned below is executed (step S22), while if it is on, the control will be continued assuming that the driver intends to carry out the operation of the RBS.

Namely, the C/U 64 checks whether or not the driver operates the parking brake 51. In this case, if the parking brake 51 is not operated and therefore the parking brake switch 52a (P/B1) is off (step S9), the program proceeds to step S11 since the RBS is operable. However, if the parking brake 51 is operated and therefore the parking brake switch 52a (P/B1) is on, the program proceeds to the conventional brake control mode (step S22) (if parking brake switch 52b is off as described below), where the RBS is prohibited from being used. This is because the car should not be started even if the accelerator pedal 54 is carelessly operated by the foot when the parking brake lever 51 is actuated.

On the other hand, it is checked whether or not another parking brake switch 52b is on for determining the transfer of the output torque of the pump/motor 14 to the car wheels 11 as the motoring mode when the parking brake is functioning in the hill start mode (step S10).

Figure 12:
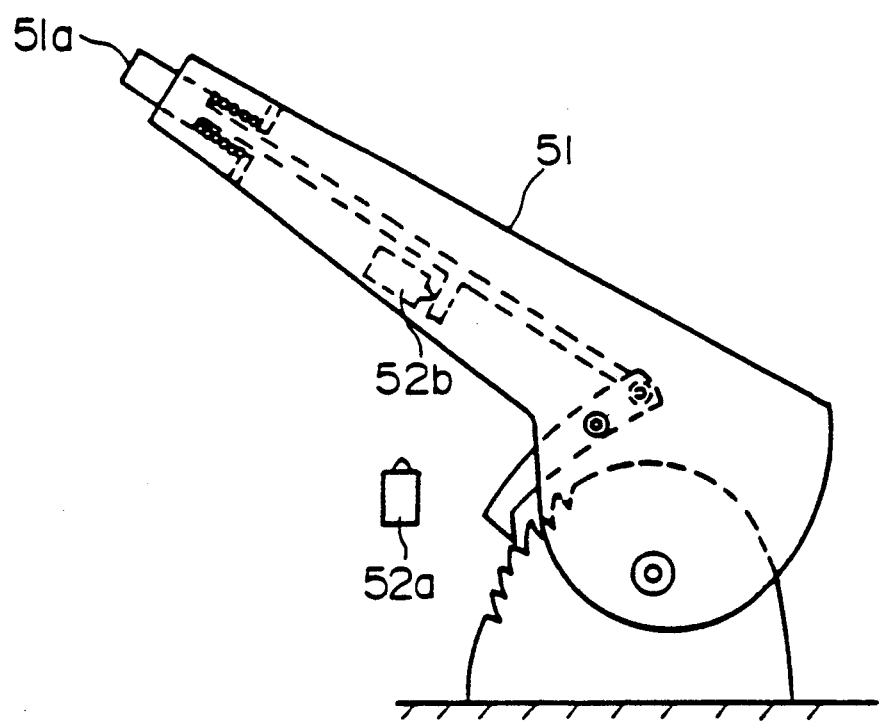
FIG. 12 is an outline diagram for explaining a parking brake lever.

It is to be noted that the parking brake switch 52b (P/B2) is rendered on only when the knob 52a of the parking brake lever 51 is depressed, as shown in FIG. 12. Namely, the condition where the knob 51a is depressed indicates the intention of the relief of the parking brake, so that the RBS should be operable even if the parking brake lever 51 is operated by the hand while the parking brake switch 52a is on.

Next, the C/U 64 checks the selected gear position by means of the gear position sensor 38 and the gear shift stroke sensor 39 (step S11). If the gear position indicates N (neutral) or R (reverse), the program proceeds to the conventional brake control mode subroutine (step S22) without the control operation of the RBS, and, if the gear position indicates the 1st~5th gear, the RBS is usable, so that the program continues the control operation of the RBS.

Then, it is checked from the output of the car speed sensor 40 whether or not the car has stopped (step S12), where if cruising, the program proceeds to step S14 to check whether or not the present car speed exceeds the permissible rotational speed of the pump/motor 14. This permissible rotational speed can be replaced by a car speed if the gear ratios of the PTO unit 8 and the axle 10 are fixed because the pump/motor 14 is connected to the wheels through the electromagnetic clutch 13, the PTO shaft 12, the PTO unit 8, the propeller shaft 9 and the axle 10. Therefore, the permissible speed for the RBS is considered to be e.g. 50 km/h based on the multiplication of the permissible rotational speed of the pump/motor 14 with the gear ratio and the circumferential length of the wheels.

In step S14, if it is found that the car speed is lower than 50 km/h, or within the permissible speed of the pump/motor 14, the control operation of the RBS continues, while if it is found that the car speed exceeds the permissible speed, the conventional brake control mode subroutine in step S22 will be executed. It is to be noted that whenever this subroutine (step S22) is executed, the bit 2 of the flag FL-RBS in FIG. 13 is set to "1".

In step S12, if it is found that the car has stopped, a start prohibition subroutine will be executed (step S13). This subroutine is limited to the case where the car is a bus, and prohibits the hydraulic oil circuit from working when the bus opens its door. Namely it is executed so as to prohibit the car from starting for the sake of passengers' safety, assuming that the passengers are getting on/off while the door is open, even if the accelerator pedal is carelessly operated by the foot.

Next, the C/U 64 checks driver's brake pedal operation (step S15) and acceleration pedal operation in sequence (step S16), the respective pedal indicator signals having been processed in the analog signal processing subroutine in step S4. The reason why the checking step of braking has a priority over that of acceleration is that the braking mode should have a priority for the safety's sake of the car in case of the simultaneous operation of the brake pedal 57 and the acceleration pedal 54.

Figure 4:
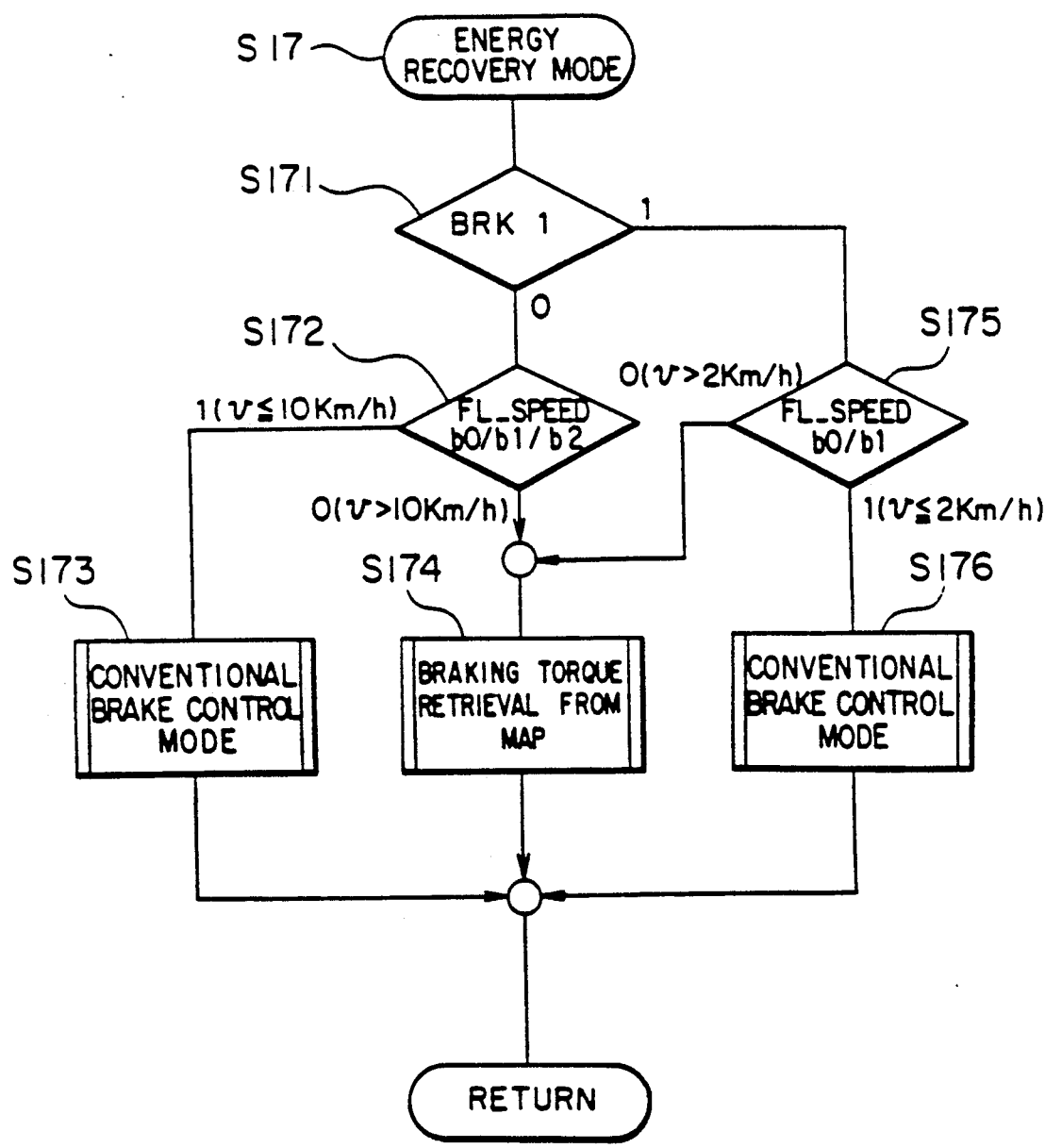
FIG. 4 is a flow chart of an energy recovery mode subroutine.

If it is found in step S15 that the brake pedal 57 is operated by the foot, an energy recovery mode subroutine shown in FIG. 4 will be executed (step S17).

In this subroutine, first of all, the bit 0 (BRK1) of the flag FL-PEDAL shown in FIG. 15 is checked (FIG. 4, step S171). This flag BRK1 is to be set when the energy recovery mode subroutine (step S17) is executed for the first time in the program in FIG. 3, and is to be reset when the first steps of the conventional brake control subroutine (step S22) and the energy regenerating control subroutine (step S20) are respectively executed. Thus, since it is 0 when the brake is used for the first time, a flag (FL-SPEED, see FIG. 13) is then checked to determine car speed (step S172).

With a low car speed (e.g. below 10 kgh) on such occasions as traffic jam where braking is frequently performed, the hydraulic controls become frequent correspondingly, so that for the reduction of the frequency of the use of the hydraulic system if any one of the bits 0, 1, 2 of the speed flag FL-SPEED is "1", the conventional brake control mode subroutine will be executed (step S173). This subroutine is the same as the subroutine of step S22 in the main program.

Figure 8:
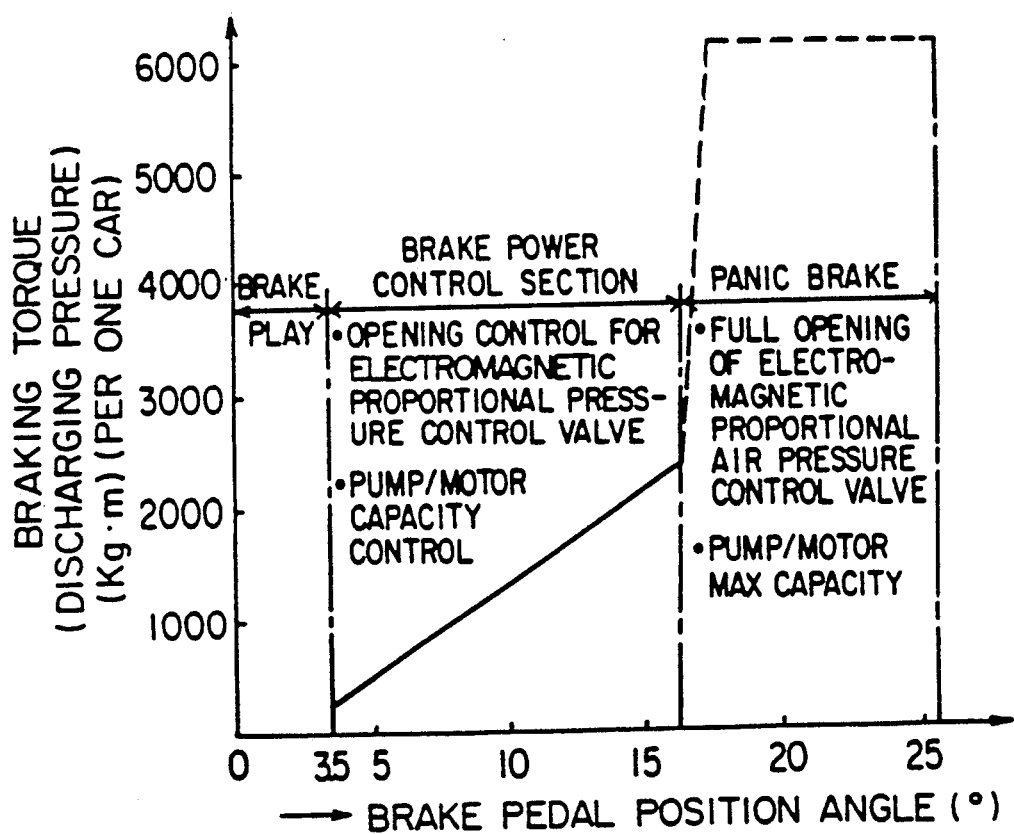
FIG. 8 is a map of braking torque vs brake pedal position.

When the car speed exceeds e.g. 10 km/h (that is, any of the bit 0, 1, 2 is "0"), a braking torque retrieval step is executed according to the braking torque map shown in FIG. 8 (step S174) in which braking torque that the driver intends to generate is searched from the position of the brake pedal 57 and is stored in the memory of the C/U 64.

Referring now to the brake torque map shown in FIG. 8, this map is stored in the memory in the C/U 64 based on the relationship between the position of the brake pedal 57 for an air brake an air oil brake, and the total braking torque for front and rear wheels per one car. Therefore, in this map, the foot operation of the pedal in the RBS is set to be equivalent to the actual foot operation of the air brake, or air oil brake etc. in the braking effectiveness in view of the feel of the pedal operation, and the passengers comfort and safety.

In FIG. 8, the initial condition (e.g. 0°~3.5°) of the foot position of the brake pedal 57 is regarded as a braking play where the output voltage of the brake pedal position sensor 59 attached to the brake pedal 57 is previously made "0" by the brake pedal switch 58. In excess of this initial condition (e.g. 3.5°), the above switch 58 is turned on, whereby the sensor 5 provides an output voltage proportional to the pedal position. Therefore, the position of the brake pedal 57 can be detected from the output of the sensor 59.

The section after the initial condition of the position of the brake pedal 57 corresponds to a braking power control section (e.g. 3.5°~16°) where the pump/motor 14 is controlled at displacement. Namely, the braking torque T corresponding to the position of the brake pedal 57 is determined from the map.

The section (e.g. 16°~25°) in excess of the braking power control section corresponds to a panic braking mode where the electromagnetic proportional air pressure control value 70 is forcibly depressed by a link mechanism (not shown) interconnected to the brake pedal 57 to interconnect the brake air tank 68 to a braking power generator, for example the air master cylinder 74 of an air oil type, which generates the maximum braking power based on the compressed air. At this time, the hydraulic oil circuit is excluded because it is possible that the car has an unstable condition.

In FIG. 4, the program proceeds to step S174 when the brake pedal is operated by the foot for the first time (flag BRL1=0) and it is found in step S172 that the car speed exceeds a predetermined low speed (e.g. 10 km/h), or when the brake pedal is continuously operated (flag BRK1=1) and it is found in step S175 that the car speed exceeds a minute speed (e.g. 2 km/h).

This is because although the energy recovered is little for the control operations of the hydraulic circuit in such a low car speed region as below 10 km/h in the initial condition (flag BRK1=0), after hydraulic braking is once effected by the pump/motor 14 (flag BRK1=1), it should be continued down to such a minute speed 2 km/h over which the pump/motor 14 may stably rotate so as to recover the deceleration energy as much as possible.

If it is found in step S175 that the car speed becomes lower than the minute speed (2 km/h), the conventional brake control mode subroutine will be executed (step S176) by using the air brake or air oil brake. This subroutine is the same as the one in step S22 of the main program.

Figure 5:
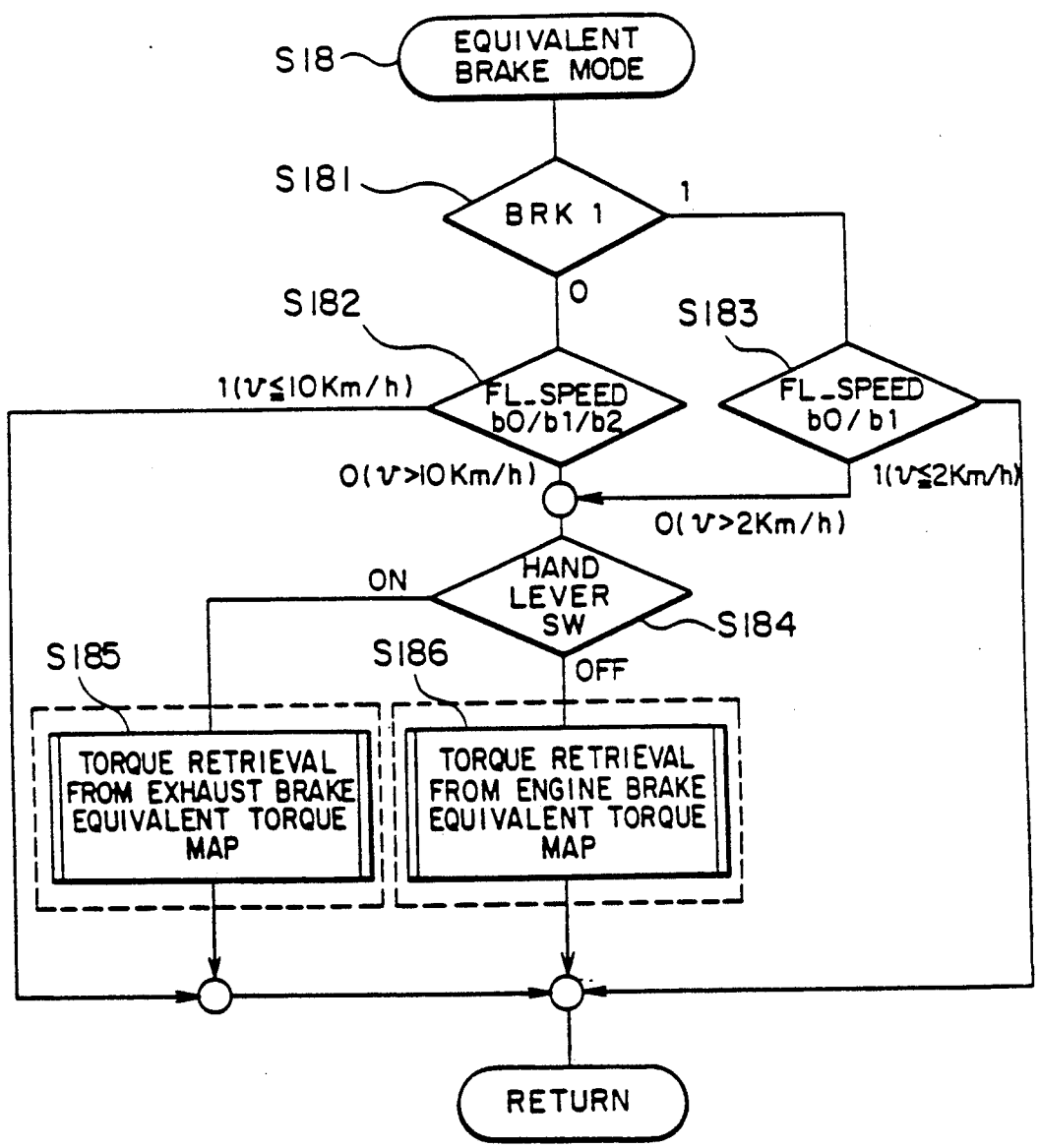
FIG. 5 is a flow chart of an equivalent (substitute) brake mode subroutine including an exhaust brake equivalent torque retrieval subroutine and an engine brake equivalent torque retrieval subroutine, indicated by dotted lines, to be executed in accordance with the present invention.

After the energy recovery mode subroutine has been thus executed, the C/U 64 executes an equivalent (substitute) brake mode subroutine shown in FIG. 5 (FIG. 3, step S18). This subroutine is to produce braking power equivalent to exhaust braking power or engine braking power.

The exhaust braking is auxiliary braking triggered by the hand lever 48 (or switch) provided at the driver's seat without operating the brake pedal 57, and the engine braking is also auxiliary braking for generating braking power as an engine load.

Namely, the RBS according to this invention performs the substitute control of the two auxiliary brakings as above noted by declutching the engine (see step S242 in FIG. 7) from the drive line of the wheels 11 in order to recover as much as possible the kinetic energy which the car has in the energy recovery mode.

In the S181 in FIG. 5, it is checked whether the hydraulic braking is effected for the first time or is continuously effected as with step S171 in FIG. 4, on the basis of the bit 0 (BRK1) of the flag FL-PEDAL. Since the flags in steps S181 and S171 are the same, if the hydraulic braking has been initiated in either the subroutine S17 or S18, then the program will proceed to step S175 or S183 in the respective mode of step S17 or S18 where a continuous braking control is executed. In step S182 as with step S172, the hydraulic braking control below a low speed region where the car speed is less than 10 kg/h, i.e., where any of the bits 0~2 of the flag FL-SPEED is "1" is not initiated. On the other hand, in step S183 as with step S175, after the braking control by the pump/motor 14 has been once initiated (flag BRK1=1), hydraulic braking control is continued while the car speed is over the minute speed (e.g. 2 km/h), that is, bit 0 or 1 of the flag FL-SPEED=0).

Then, it is checked whether or not the hand lever 48, which can be a switch, at the driver's seat is on (FIG. 5, step S184). If lever 48 is on, braking torque equivalent to that in the exhaust braking is retrieved from a map (step S185).

Figure 9A:
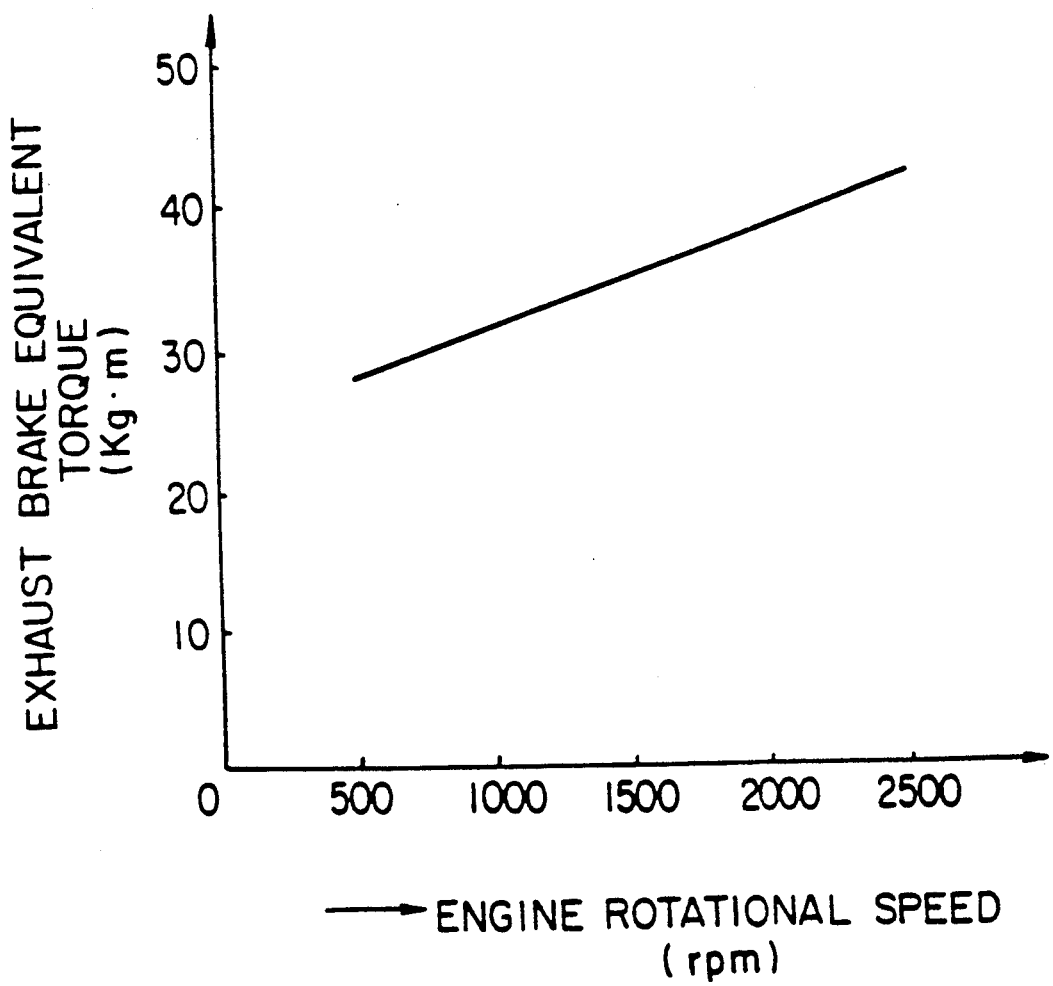
FIGS. 9A and 9B are maps of exhaust brake equivalent torque vs engine speed and car speed, respectively.
Figure 9B:
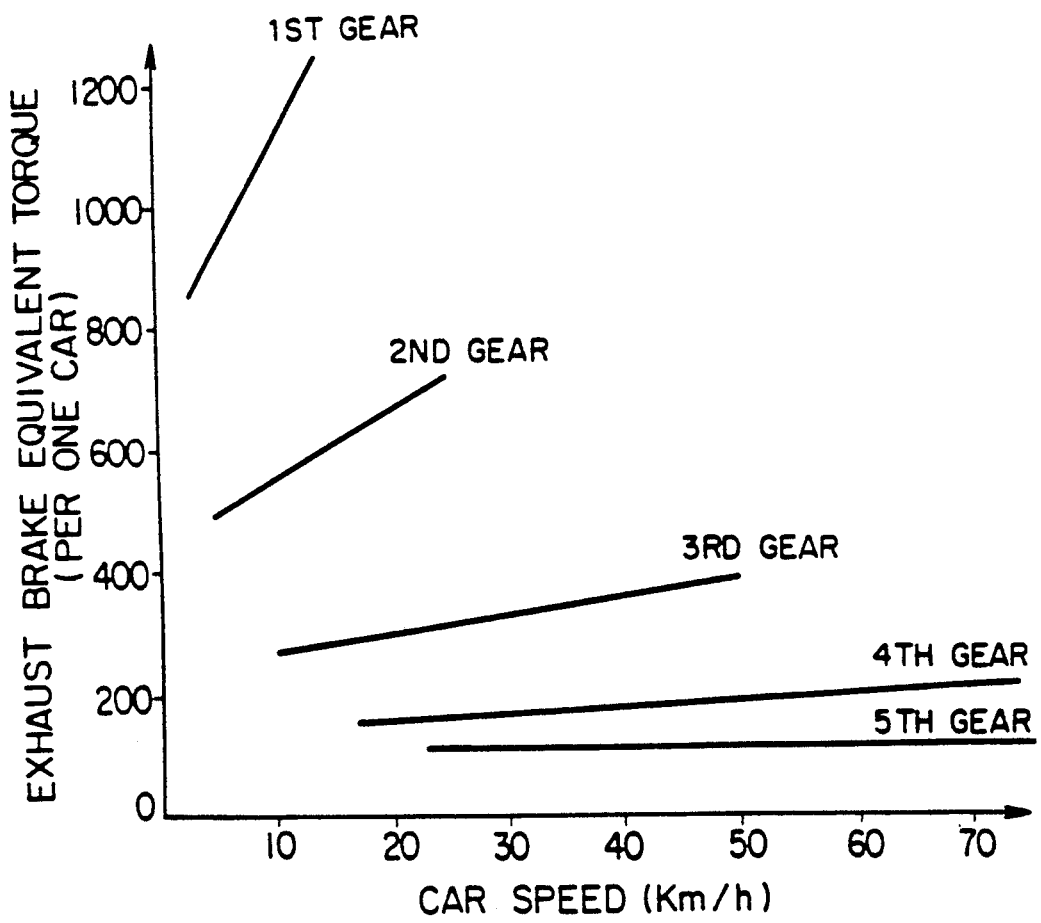

FIG. 9A shows the map of the exhaust brake equivalent torque in response to engine speed. Since this map indicates braking torque produced by the engine 1, in order to produce the braking torque at the wheels 11, as shown in FIG. 9B, this braking torque is stored in the memory in the C/U 64 as a net value which is obtained by the multiplication of the present gear position with the gear ratio of the final gear in response to car speed.

By the retrieval of the exhaust brake equivalent torque, a substitute braking torque which corresponds to the actual exhaust braking is given for drivers who are accustomed to the exhaust braking.

Figure 10A:
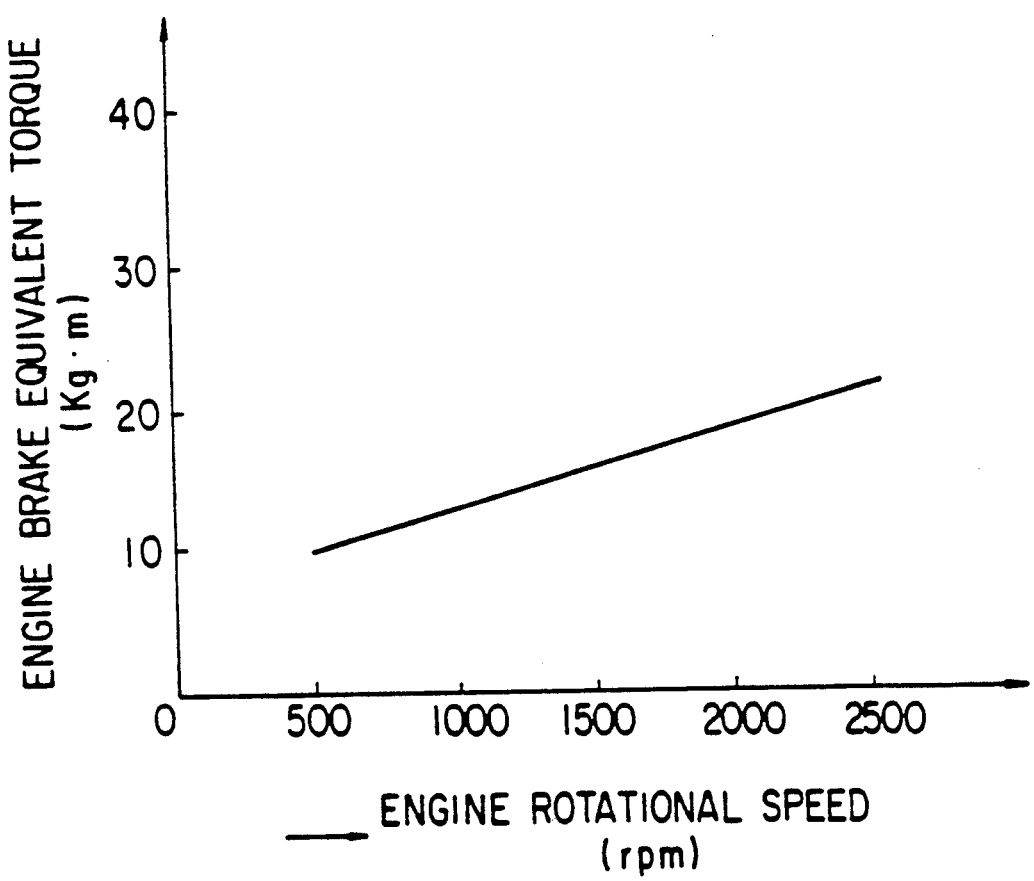
FIGS. 10A and 10B are maps of engine brake equivalent torque vs engine speed and car speed, respectively.

On the other hand, if it is found in step S184 that the hand lever 48 is off, braking torque equivalent to that in the actual engine braking is retrieved from the map shown in FIG. 10A (step S186).

Figure 10B:
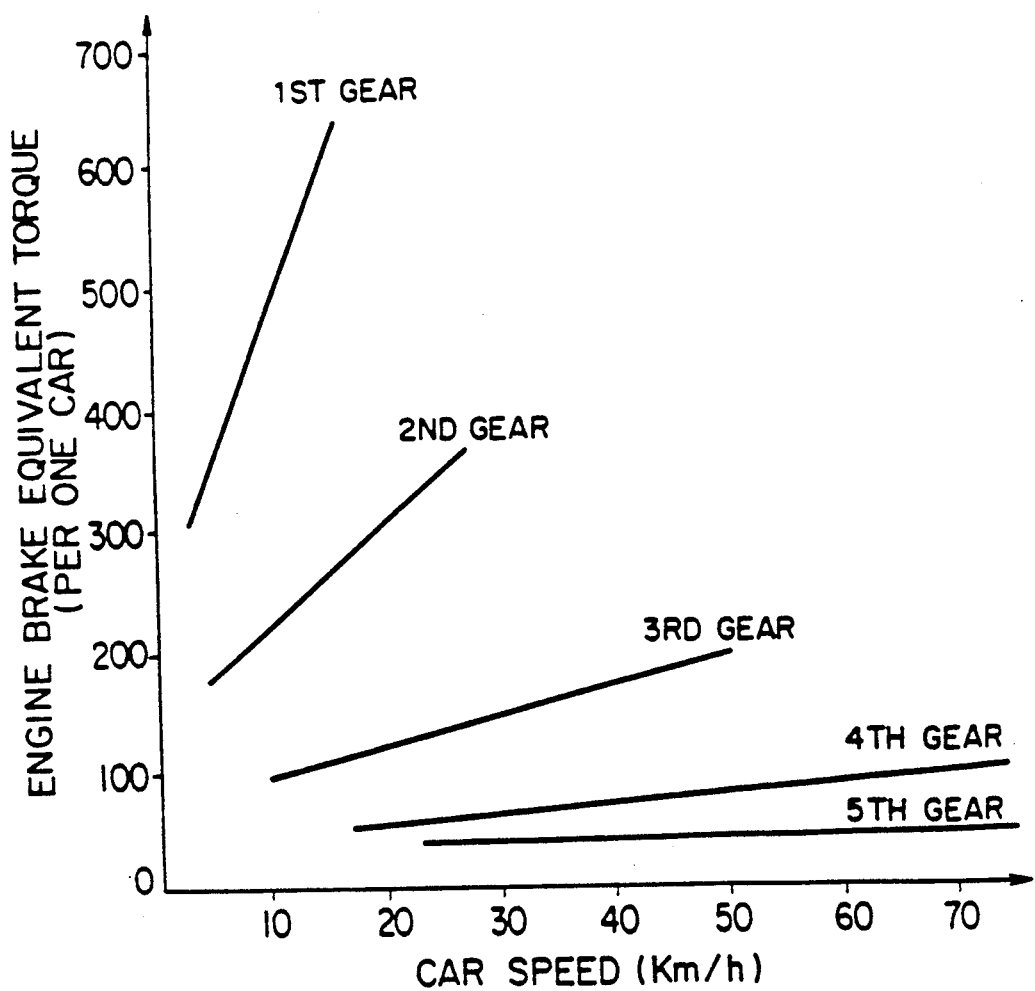

FIG. 10A shows the map of the engine brake equivalent torque in response to engine speed. Since this map indicates braking torque produced by the engine 1, so that in order to produce the braking torque at the wheels 11, as shown in FIG. 10B, this braking torque is stored in the memory in the C/U 64 as a net value which is obtained by the multiplication of the present gear position with the gear ratio of the final gear in response to car speed.

As seen in FIG. 3, the program proceeds to the above equivalent braking subroutine in step S18 from the subroutine in step S17 if the brake pedal 57 is operated by the foot or from the subroutine in step S16 if the acceleration pedal 54 is not operated (i.e. the acceleration pedal is positioned at the idle position).

The equivalent brake mode subroutine (step S18) has nothing to do with the brake pedal operation such as in step S17 because of the substitute mode of auxiliary braking produced by the engine.

Namely, in either of exhaust braking or engine braking, the substitute power will be produced under the control of the output of the hand lever 48 unless the acceleration pedal 54 is operated. In other words, if the car cruises at a predetermined speed (e.g. 10 km/h or 2 km/h as shown in FIGS. 4 and 5) or more even when braking power is determined and generated, through steps S21 and the following, corresponding to the position of the brake pedal in step S174, braking torque equivalent to the exhaust braking or engine braking is further determined and additionally generated.

Of course, if the car has the idle condition, the program will proceed to this equivalent braking torque subroutine from step S16 without passing through the subroutine in step S17.

Then, the C/U 64 executes a pump calculation subroutine which determines the capacity of the pump/motor 14 required to produce braking torque retrieved by the subroutine in steps S17, S18 according to the inner pressure of the hydraulic circuit (step S19, FIG. 3).

This subroutine integrates necessary overall braking torque which the pump/motor 14 requires in each of the braking modes retrieved in steps S17, S18.

Next, the capacity $V_P$ of the pump/motor 14 is determined according to the following theoretical Equation (1) by using the torque T for the pump/motor 14 obtained from the necessary overall braking torque divided by the gear ratio of the final gear and the PTO unit.

$$V_P = 200\pi T/P \quad (1)$$

where
P: Inner oil pressure of hydraulic circuit detected by pressure sensor 47 (kg/cm$^2$),
$V_P$: Capacity of pump/motor (cc),
T: Required braking torque (kg/m).

Figure 11:
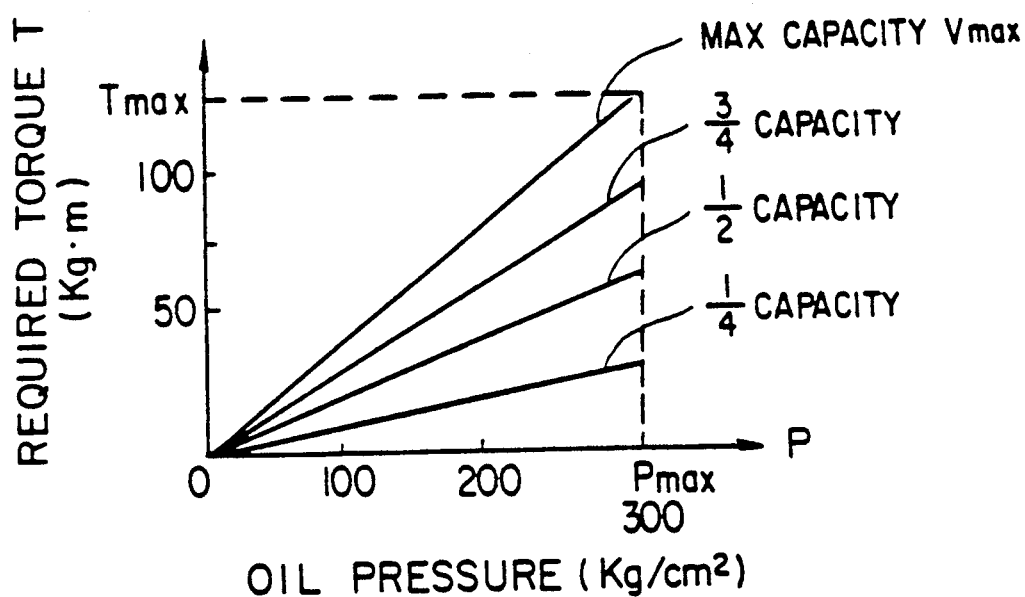
FIG. 11 is a braking torque map for a pump/motor.

However, since this calculation is complicated, the map of the above noted oil pressure, torque and capacity as shown in FIG. 11 is prepared by using Equation (1) to retrieve a necessary capacity $V_P$ from the oil pressure P and the required braking torque T.

This invention can utilize the pump/motor 14 of a swash shaft piston type or a swash plate piston type, so that the capacity $V_P$ is controlled by varying the displacement (incline) angle of the swash shaft (plate).

Returning to step S16 of the main program in FIG. 3, when the accelerator pedal 54 is operated by the foot, the C/U 64 executes an energy regenerative mode subroutine, in which deceleration energy as accumulated in the high pressure accumulator 26 is utilized for cruising the car (FIG. 3, step S20).

In this subroutine, the position of the accelerator pedal 54 is detected by the sensor 56 in each of the gear positions to determine a corresponding necessary torque, and the displacement angle (capacity) of the pump/motor 14 is determined from this torque and the present accumulated pressure of the hydraulic circuit.

It is to be noted in this subroutine that if the accumulated pressure of the hydraulic circuit is insufficient for the required cruising torque according to the acceleration pedal position, the C/U 64 clutches the engine 1 to compensate for the corresponding shortage of torque.

Then, the main program executes the conventional brake control mode subroutine, as above noted, of step S22, in which mode only air braking or air oil braking is effected without hydraulic pressure.

Figure 6:
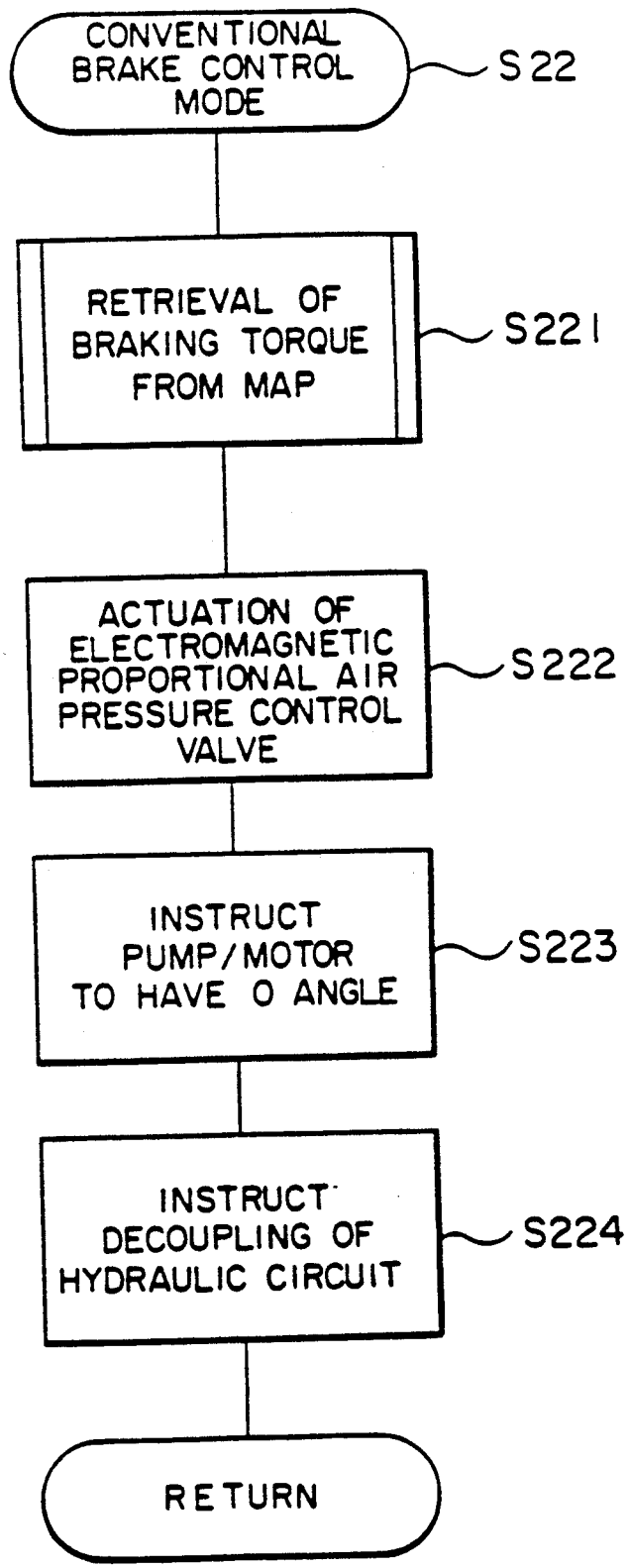
FIG. 6 is a flow chart of a conventional brake control mode subroutine.

As described in FIG. 6, in this subroutine corresponding necessary braking torque is retrieved from the map in FIG. 8 based on the position of the brake pedal 57 (FIG. 6, step S221). This map indicates a discharging characteristic curve such as in conventional air brake type cars (or air oil brake type cars), so that the thus retrieved braking torque corresponds to the discharging pressure of the electromagnetic proportional air pressure control valve 70 supplied to the air master cylinder 74 in case of e.g. air oil brake. It is to be noted that when the program proceeds to this subroutine from steps S8, S10, S11 and S14 in FIG. 3, the position of the brake pedal 57 should be given to determine the braking torque, i.e. the discharging pressure.

Next, based on the discharging pressure retrieved in step S221, the control valve 70 is driven (step S222), and in order to make the hydraulic circuit off in view of the fact that this subroutine only employs air pressure, the displacement angle of the pump/motor 14 is made "0" (step S223) and the circuit switch valve 25 and the electromagnetic clutch 13 are made off (step S224), the program returning to FIG. 3.

After the above various controls, the C/U 64 performs an oil content control subroutine (FIG. 3, step S21). In this subroutine, whether or not oil replenishment is necessary is checked depending on whether the oil content detection limit switch 45 is on or off, to generate operation requests for the electromagnetic valve 31, 32.

Figure 16:
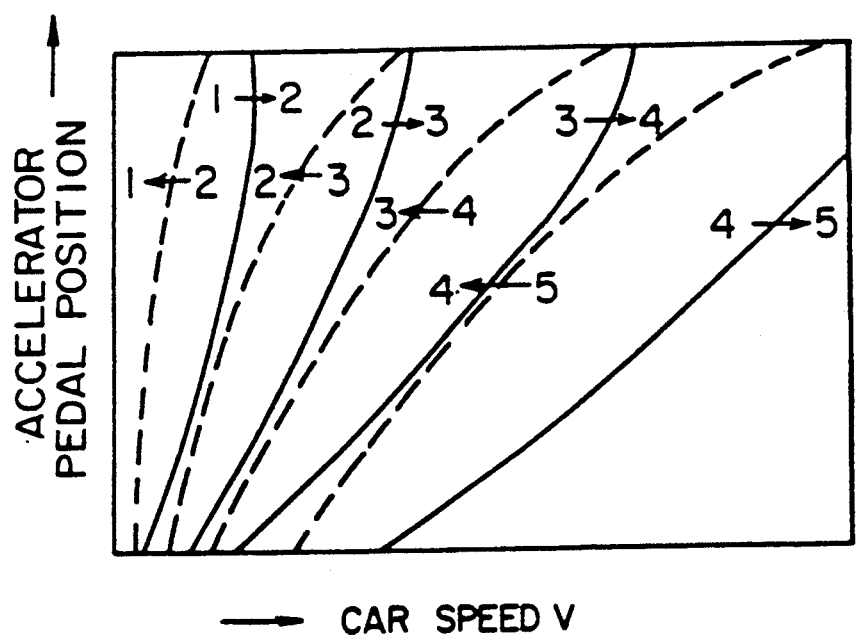
FIG. 16 is a known gear shift map based on car speed and accelerator pedal position.

Also, the C/U 64, as in well-known Japanese Patent Application laid-open No. 60-11769, reads a car speed signal from the car speed sensor 40, an acceleration signal corresponding to the foot position of the accelerator pedal 54 from the acceleration opening sensor 56, and a selection signal (matrix signal) from the gear selection lever 60, and selects an optimum gear position of the T/M 5 on the basis of the map shown in FIG. 16 prepared according to the car speed and the position of the acceleration pedal 54 (FIG. 3, steps S23 and S24).

This is accomplished by driving the clutch actuator 7 and the gear shift actuator 6 to decouple the engine clutch (not shown), by neutralizing the gear of the T/M 5, by selecting and shifting the gear to couple the engine clutch, whereby the gear position of the T/M 5 is automatically shifted up/down to a suitable one in accordance with the car speed and the position of the accelerator pedal 54.

Through the determination in the various subroutines as noted above, the C/U 64 actually controls the various components of the car.

Figure 7:
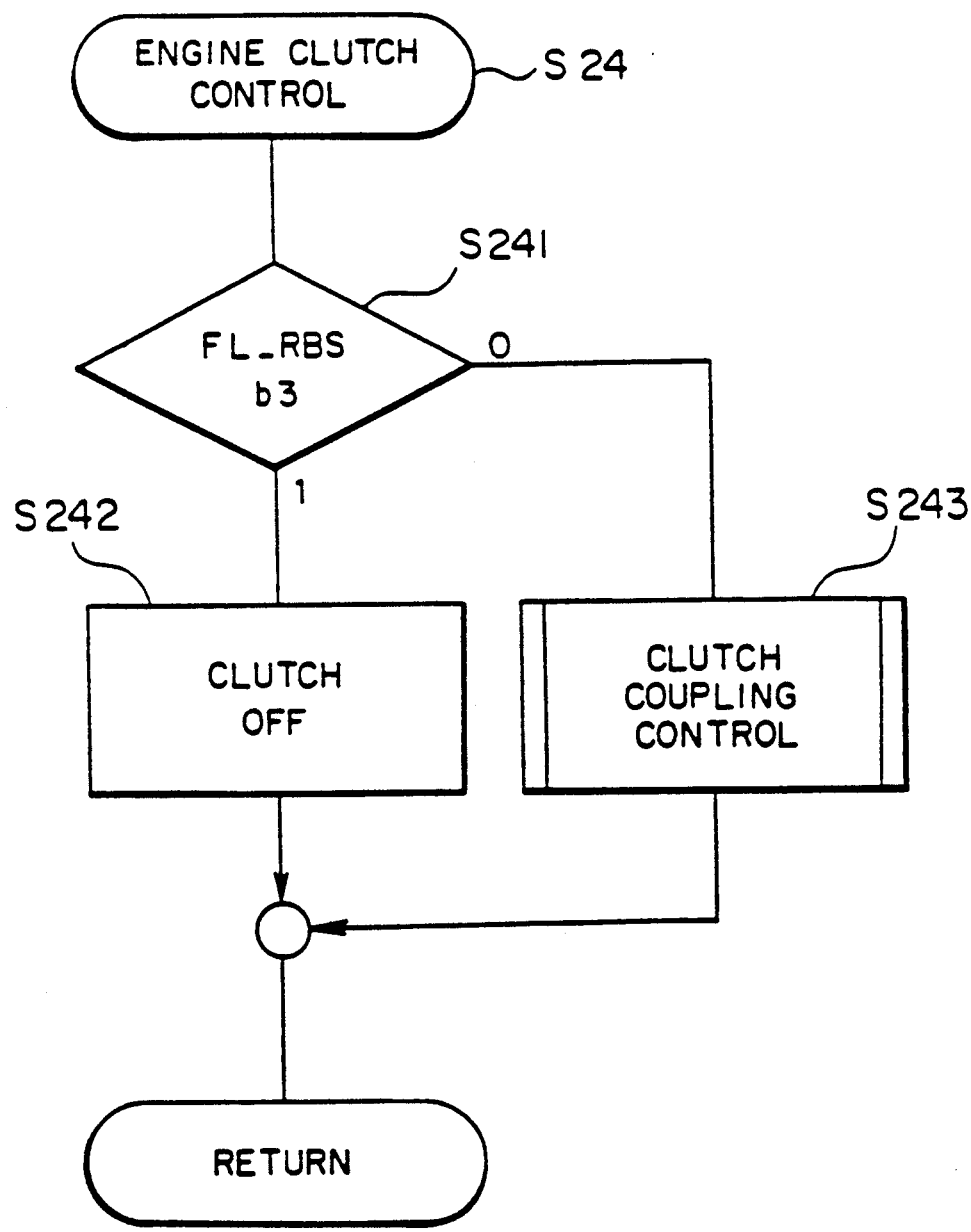
FIG. 7 is a flow chart of a determination subroutine for a clutch control method.

Namely, the C/U 64 declutches the engine 1 on the basis of a determining subroutine for a clutch control method shown in FIG. 7 if the bit 3 of the flag FL-RBS is "1" (FIG. 7, step S241) only for the hydraulic cruising (step S242). The bit 3 of the flag R1-RBS is, as shown in FIG. 14, set necessarily in the energy recovery mode in step S17 and is set in case where the car cruises only with hydraulic pressure in the energy regenerative mode in step S20.

It is to be noted that an automatically clutched auto-transmission car is already known for coupling/decoupling the engine clutch while even a car without the auto-transmission may be used with only the engine clutch being automatically coupled/decoupled. Furthermore, in case of a fluid type auto-transmission car, the decoupling of the engine is similarly effected with the gear being controlled at neutral.

Subsequently, in accordance with the capacity of the pump/motor 14, the connection/disconnection of the electromagnetic clutch 13, and the switching position of the circuit switching valve 25 that have already been determined in the above mentioned energy recovery mode, regenerative mode, conventional brake control mode, etc., the program executes a hydraulic circuit control subroutine for actually driving these components.

This hydraulic circuit control subroutine actually controls the circuit switching valve 25, the pump/motor 14, and the electromagnetic clutch 13 forming the hydraulic circuit on the basis of the above noted various judgements and calculated results.

After the hydraulic circuit control (step S25), the program executes an idle control subroutine in which the C/U 64 reads the signals from the directly linked cooling relay switch 33 and the water temperature sensor 34 to stabilize the idling rotation during cooling in the idling mode of the engine 1 and also to stabilize the idling rotation in the driving mode of the replenishing pump 30 (step S26).

Then, the target position of the step motor 3 for fuel injection is set according to the output torque of the engine 1 determined in the above energy regenerative mode etc. to execute an engine control subroutine (step S27).

In this case, the engine 1 is controlled at an idling mode when the capacity of the pump/motor 14 determined in the above energy regenerative mode is lower than 250 cc (V<250 cc), while being controlled to produce a necessary output determined from the following Equation (2) when V >250 cc.

$$\text{Engine output required} = [((T/M \text{ output required}) - (\text{maximum output of pump/motor})) \times (PTO \text{ gear ratio})/(T/M \text{ gear ratio})] \quad (2)$$

This engine output is obtained by a fuel injection governor driven by the step motor after the conversion into the position of the accelerator pedal.

After the aforementioned control and processing, an indicator control subroutine is executed which includes indications for the hydraulic pressure and power source (oil pressure, engine) and controls the indications of the indicators 63 (step S28).

An HSA control subroutine is executed which closes HSA valve 72 to retain the braking condition under the condition that the car speed is stopped and the brake pedal 57 is operated, and which relieves the braking condition under the condition that the accelerator pedal 54 is operated by the foot or the gear selection lever 60 is positioned at the neutral (step S29).

After this, the program checks whether or not the timing for the execution of self diagnoses has lapsed (step S30), and when the timing lapses such self diagnoses is periodically (e.g. 500 ms) executed (step S31). After a waiting time for making the processing time fixed (step S32), the program returns to step S2 for the repetition of the above processing.

It is to be noted that the above subroutines (steps S23~31) may be applied with presently known art.

What is claimed is:

1. A regenerative braking system for a car having a transmission, an exhaust brake, an engine and a power take-off unit, comprising:
   a hydraulic oil circuit formed of:
      a high pressure accumulator;
      a pump/motor having a pumping capacity and including means for varying the pumping capacity of said pump/motor;
      a circuit valve coupled to said pump/motor and said high pressure accumulator; and
      a low pressure accumulator coupled to said circuit valve;
   an electromagnetic clutch, coupled to said pump/motor for connecting or disconnecting said pump/motor to or from the power take-off unit;
   manual operating means for actuating the exhaust brake;
   means for sensing the gear position of the transmission;
   means for sensing car speed;
   means for sensing the inner pressure of said hydraulic oil circuit; and
   control means for determining an exhaust brake equivalent torque corresponding to a predetermined relationship between the sensed car speed and the sensed gear position when the sensed car speed exceeds a predetermined speed and said manual operating means is actuated, and for determining the pumping capacity of said pump/motor in response to the inner pressure of said hydraulic oil circuit and the determined exhaust brake equivalent torque, said control means then decoupling the engine of the car from the power take-off unit, closing said hydraulic oil circuit to operate said pump/motor, providing a capacity control signal to said means for varying the pumping capacity so that the pumping capacity is caused to be the determined pumping capacity, and actuating said electromagnetic clutch to connect said pump/motor to the power take-off unit, whereby the deceleration energy of the car is accumulated into said high pressure accumulator.

2. A regenerative braking system for a car according to claim 1, wherein said control means includes a stored map defining a relationship between car speed data, exhaust brake equivalent torque data, and inner pressure data.

3. A regenerative braking system for a car according to claim 1, wherein said control means switches over said circuit valve so that said hydraulic oil circuit may have therein the hydraulic flow from said low pressure accumulator to said high pressure accumulator.

4. A regenerative braking system for a car according to claim 1, wherein the car has an engine clutch and wherein said control means controls the engine clutch to decouple the engine.

5. A regenerative braking system for a car according to claim 1, wherein the predetermined car speed at the time when said control means first actuates said hydraulic oil circuit is set higher than the predetermined car speed at the time when said control means continues to actuate said hydraulic oil circuit.

6. A regenerative braking system for a car having an engine, an exhaust brake, a transmission and a power take-off unit, comprising:
a hydraulic oil circuit formed of:
a high pressure accumulator;
a pump/motor having a pumping capacity and including means for varying the pumping capacity of said pump/motor;
a circuit valve coupled to said high pressure accumulator and said pump/motor; and
a low pressure accumulator coupled to said circuit valve;
an electromagnetic clutch, coupled to said pump/motor, for connecting or disconnecting said pump/motor to or from the power take-off unit;
manual operating means for actuating the exhaust brake;
means for sensing the gear position of the transmission;
means for sensing car speed;
means for sensing the inner pressure of said hydraulic oil circuit; and
control means for determining an engine brake equivalent torque corresponding to a predetermined relationship between the sensed car speed and the sensed gear position when the sensed car speed exceeds a predetermined speed and said manual operating means is not actuated, and for determining the pumping capacity of said pump/motor in response to the inner pressure of said hydraulic oil circuit and the determined engine brake equivalent torque, said control means then decoupling the engine of the car from the power take-off unit, closing said hydraulic oil circuit to operate said pump/motor, providing a capacity control signal to said means for varying the pumping capacity so that the pumping capacity is caused to be the determined pumping capacity, and actuating said electromagnetic clutch to connect said pump/motor to the power take-off unit, whereby the deceleration energy of the car is accumulated into said high pressure accumulator.

7. A regenerative braking system for a car according to claim 6, wherein said control means includes a stored map defining a relationship between car speed data, engine brake equivalent torque data, and inner pressure data.

8. A regenerative braking system for a car according to claim 6, wherein said control means switches over said circuit valve so that said hydraulic oil circuit may have therein the hydraulic flow from said low pressure accumulator to said high pressure accumulator.

9. A regenerative braking system for a car according to claim 6, wherein the car has an engine clutch and wherein said control means controls the engine clutch to decouple the engine.

10. A regenerative braking system for a car according to claim 6, wherein the predetermined car speed at the time when said control means first actuates said hydraulic oil circuit is set higher than the predetermined car speed at the time when said control means continues to actuate said hydraulic oil circuit.

11. A regenerative braking system for a vehicle having a transmission, an exhaust brake, an engine and a power take-off unit, comprising:
a hydraulic circuit including a pump/motor having a pumping capacity and including means for varying the pumping capacity of said pump/motor;
means for actuating the exhaust brake;
means for sensing the gear position of the transmission;
means for sensing vehicle speed;
means for sensing an inner pressure of said hydraulic circuit; and
control means for determining an exhaust brake equivalent torque corresponding to a predetermined relationship between the sensed car speed and the sensed gear position when the sensed car speed exceeds a predetermined speed and the exhaust brake is actuated, and for determining the pumping capacity of said pump/motor in response to the inner pressure of said hydraulic circuit and the determined exhaust brake equivalent torque, said control means decoupling the engine of the vehicle from the power take-off unit, closing said hydraulic circuit to operate said pump/motor, connecting said pump/motor to the power take-off unit, and providing a capacity control signal to said means for varying the pumping capacity so that the pumping capacity is caused to be the determined pumping capacity, and so that deceleration energy of the vehicle is accumulated in said hydraulic circuit.

12. A regenerative system for a car having an engine, an exhaust brake, a transmission and a power take-off unit, comprising:
a hydraulic circuit including a pump/motor having a pumping capacity and including means for varying the pumping capacity of said pump/motor;
means for connecting or disconnecting said pump/motor to or from the power take-off unit;
means for actuating the exhaust brake;
means for sensing the gear position of the transmission;
means for sensing vehicle speed;
means for sensing an inner pressure of said hydraulic circuit; and
control means for determining an engine brake equivalent torque corresponding to a predetermined relationship between the sensed car speed and the sensed gear position when the sensed car speed exceeds a predetermined speed and the exhaust brake is not actuated, and for determining the pumping capacity of said pump/motor in response to the inner pressure of said hydraulic circuit and the determined engine brake equivalent torque, said control means decoupling the engine of the vehicle from the power take-off unit, closing said hydraulic circuit to operate said pump/motor, providing a capacity control signal to said means for varying the pumping capacity so that the pumping capacity is caused to be the determined pumping capacity, and connecting said pump/motor to the power take-off unit, so that deceleration energy of the vehicle is accumulated in said hydraulic circuit.

* * * * *

UNITED STATES PATENT AND TRADEMARK OFFICE
CERTIFICATE OF CORRECTION

PATENT NO. :    5,086,865

DATED      :    FEBRUARY 11, 1992

INVENTOR(S) :   KOJI TANAKA ET AL.

It is certified that error appears in the above-identified patent and that said Letters Patent is hereby corrected as shown below:

IN THE DRAWINGS

Sheet 1 of 19 (FIG. 1B is a duplicate).

Figure 1A:
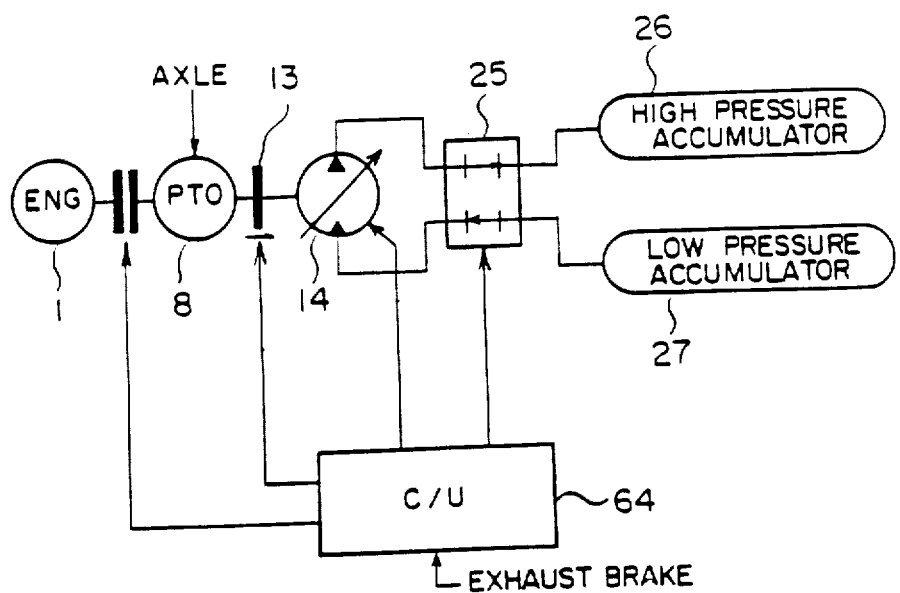
FIG. 1A is a conceptual diagram of a regenerative braking system for a car in accordance with the present invention.

Please insert the attached FIG. 1A to replace the first FIG. 1B, which was inadvertently omitted. Please note that the second FIG. 1B remains as is (Sheet 2 of 19).

Col. 8,   line 4,   "knob 52a" should be --knob 51a--.

Col. 9,   line 26,  "brake an" should be --brake or an--;

line 62,  "BRL1=0)" should be --BRK1=0)--.

Col. 10,  line 43,  "kg/h," should be --km/h,--.

Col. 13,  line 55,  "[((T/M" should be --((T/M--.

Signed and Sealed this

Sixth Day of July, 1993

Attest:

MICHAEL K. KIRK

Attesting Officer    Acting Commissioner of Patents and Trademarks